United States Patent [19]

Campbell et al.

[11] Patent Number: 5,093,917
[45] Date of Patent: Mar. 3, 1992

[54] METHOD FOR PASSING DATA PARAMETERS BETWEEN A CALLING PROGRAM AND A CALLED SUBROUTINE IN A COMMAND ANALYSIS TABLE OF A COMPUTER STORED DATA BASE SYSTEM

[75] Inventors: Brian D. Campbell, Phoenix; Todd L. Chesney, Peoria; David R. Glick, Phoenix; Dane S. Iverson, Phoenix; Elizabeth A. Koval, Phoenix; Richard L. Miskowski, Glendale, all of Ariz.; Kent A. Parkison, Omaha, Nebr.; Gregory E. Wilson, Englewood, Colo.

[73] Assignee: AG Communication Systems Corporation, Phoenix, Ariz.

[21] Appl. No.: 451,903

[22] Filed: Jan. 17, 1990

[51] Int. Cl.⁵ .............................................. G06F 9/40
[52] U.S. Cl. ............................ 395/700; 364/DIG. 1; 364/261.4; 364/238.6; 364/282.1
[58] Field of Search ... 364/200 MS File, 900 MS File

[56] References Cited

U.S. PATENT DOCUMENTS

| | | | |
|---|---|---|---|
| 4,253,146 | 2/1981 | Bellamy et al. | 364/200 |
| 4,429,361 | 1/1984 | Maccianti et al. | 364/200 |
| 4,811,208 | 3/1989 | Myers et al. | 364/200 |
| 5,043,870 | 8/1991 | Ditzel et al. | 364/200 |

Primary Examiner—Thomas M. Heckler
Attorney, Agent, or Firm—Gregory G. Hendricks

[57] ABSTRACT

A method for passing data parameters between a calling program and a called subroutine in a command analysis table of a computer stored data base system is disclosed. The method uses special operating codes written in the native language of the command analysis table, that allow the calling program to put pertinent information about the calling parameters into a temporary storage area. The called program or subroutine, uses a second op-code to collect the stored parameters in the temporary storage area. The pulled parameters are then used to initialize local variables and to load parameter values used by the called subroutine, into associated local registers. Information previously stored in the local registers is saved, and returned to the local registers when the subroutine finishes. Pertinent information for returning back to the calling program is also saved.

5 Claims, 2 Drawing Sheets

METHOD FOR PASSING DATA PARAMETERS BETWEEN A CALLING PROGRAM AND A CALLED SUBROUTINE IN A COMMAND ANALYSIS TABLE OF A COMPUTER STORED DATA BASE SYSTEM

BACKGROUND OF THE INVENTION

1. Field of the Invention

The present invention relates to the field of computer stored data base systems and, more particularly, to a new and improved method of software register allocation between the calling program and the called subroutine in a command analysis table.

2. Description of the Prior Art

Stored program control, digital telephone switching systems are modern replacements for the electromechanical telecommunication systems used in years past. These distributed microprocessor controlled systems include an administrative processor, telephony processors, local and remote switching processors, and remote line processors. The data base for such systems is distributed in memories in many of the processor complexes of the telephone switch. Administration of such large and complex data bases requires a system that is table-driven to the extent that virtually all the protected data concerning administration of the data base and analysis of data base commands is in tables. This allows for an efficient fully engineerable on-line data base that provides access to the data to easily accommodate changes in service or features.

The system data base is modified by Recent Change (RC) commands, which are input to the system via a terminal or magnetic media. The RC commands act upon and/or modify the resident data base according to program directives defined by Command Analysis Tables (CAT). Commands entered into the system are processed according to data residing in the CAT program and the existing command validation routines in the central data base. The resulting office dependent data base changes are applied back to the central data base and to the peripheral processors.

Therefore, CAT program code, is table driven software. Data, that is internal to a CAT code program for intermediate calculations and manipulations, is stored in special software registers residing in system memory. The main CAT programs, as well as its subroutines, share these registers for data manipulation, data storage and data passing.

In the past RC commands were simple in nature, with the program code being fairly straight forward with little sophistication in its coding techniques. Handling of the aforementioned software registers was not perceived to be a problem when designing the CAT program code and its constructs. However, with the introduction of complicated telephony features, the data base manipulation requirements became more difficult. This led to larger CAT code programs requiring more complicated coding techniques. In the CAT code program language, there is no such structure as a local variable. The defined software registers are the variables. The designer or programmer ultimately determines register usage. Problems arise with register usage when a main program using a particular register calls a subroutine which uses the same register locally.

All data used by subroutines in the CAT operating code are passed through registers. A set number of registers are allocated to Input/Output (I/O), and general use. In this environment, every designer or programmer having a routine that uses any register, must choose these registers cautiously. Since the registers are a shared resource, a designer must be aware of the registers used by the main program and any subroutines. This ultimately results in CAT code routines that are tightly coupled. Tightly coupled routines carry the risk of having a modification to a subroutine adversely affect other existing routines within the program.

This situation can create a maintenance environment that is error prone. To support new features within the telephony system, new programs are introduced, and old programs modified to acquire new functions. Further, to fix errors in existing routines requires additional use of registers. Still further, each piece of software is maintained by a person other than its designer or programmer. All of these factors aggravate the problems in tracking the usable registers across the many programs and routines in the CAT program, which inevitably leads to register corruption.

Therefore, it is advantageous to provide an arrangement that allows new routines to be written in such a way as to let parameter passing to be largely transparent, with no register tracking. Such an arrangement, would not require the need to track register usage for possible corruption in the calling programs.

Accordingly, it is an object of the present invention, to provide a method that provides for local variables in each subroutine, to prevent corruption of global variables. It is a further object of the present invention, to provide a method that reduces the effort normally required when coding subroutines, by shielding the designer or programmer from register usage and assignment. It is still a further object of the present invention, to provide a method that saves development effort by promoting subroutine reuse between command programs, in order to reduce the number of errors in coding new routines.

DISCLOSURE OF THE INVENTION

The above and other objects, advantages, and capabilities are realized in a method that passes data parameters and parameter values between a calling routine and a called subroutine in a stored program control computer system having a data base system. The stored program control computer system operates in accordance to data stored in the data base. The data base is arranged to be modified and updated by commands and data input to the data base system by a user terminal or a magnetic data device and also by directives defined by a command analysis table contained in the stored program control computer system. The command analysis table includes a local command buffer which includes a plurality of input/output software registers and global software registers for the storage of parameter values between the calling routine and a called subroutine.

The method of the present invention comprises the steps:

(1) Providing a plurality of local variable software registers to the local command buffer.

(2) Providing a user enterable initialization command code or operations code (op-code) coded in the native operating language of the command analysis table. The op-code is invoked before the called subroutine is entered. The op-code also includes register identification data defining the input/output registers and global registers of the local command buffer containing parameter values to be passed to the called subroutine.

(3) Gathering the parameter values contained in the respectively defined input/output and global registers of the local command buffer.

(4) Storing the register identification data and associated parameter values to a first software buffer configured as an array of storage locations, labeled STORAGE_ TABLE.

(5) Providing a user enterable subroutine command code or op-code, invoked as the first statement of the called subroutine. The op-code includes: a first sum representing the number of input/output and global registers containing read only parameter values that will be used by the called subroutine, a second sum representing the number of input/output and global registers containing read/write parameter values used by the called subroutine, and a third sum with the required number of local variable registers needed to be used by the called subroutine.

(6) Storing the current contents of the local variable registers that are defined by the third sum, in a second software buffer configured as an array of storage locations, labeled PARM_ BUFFER.

(7) Storing the first, second and third sums to a first storage location in PARM_ BUFFER.

(8) Storing the contents of STORAGE_ TABLE to a second and subsequent locations of PARM_ BUFFER.

(9) Transferring the parameter values contained in the defined read only registers and defined read/write registers to successive local variable registers.

(10) Executing the called subroutine using the parameter values contained in the local variable registers.

Upon the completion of the called subroutine.

(12) Transferring the contents of the local variable registers used by the called subroutine to the read/write registers defined by the register identification data contained in PARM_ BUFFER.

(13) Returning the original contents of the local variable registers from PARM_ BUFFER to the local variable registers and returning to the calling program from the called subroutine.

BRIEF DESCRIPTION OF THE DRAWINGS

A better understanding of the invention may be had from the consideration of the following detailed description taken in conjunction with the accompanying drawings in which.

DESCRIPTION OF A PREFERRED EMBODIMENT

Figure 1:
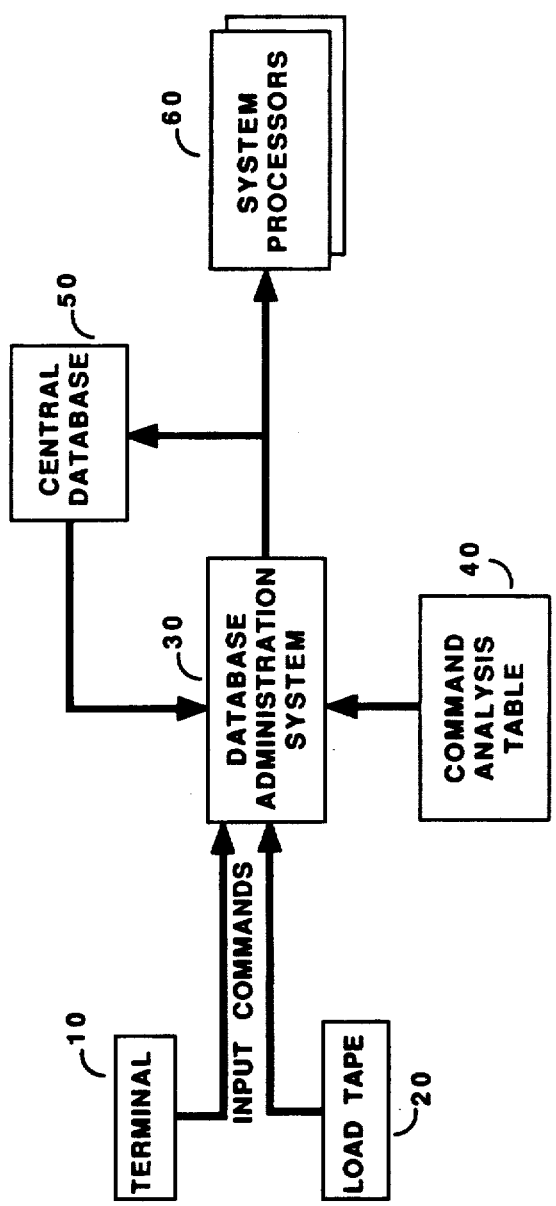
FIG. 1 is a block diagram of a data base administration system of a stored program control digital telephone switching system, where the method of the present invention is used to advantage.

Turning now to the FIG. 1 of the included drawings, a block diagram of a data base administration system of a stored program control digital telephone switching system, is shown. Service changes or engineering modifications to the switching system are made by Recent Change (RC) commands. The RC commands are input to the data base administration system 30 via a user terminal 10, or a magnetic media device such as a magnetic tape recorder 20. The RC commands are processed according to data and program directives defined in the Command Analysis Table (CAT) 40 and validated by the existing switching system data in the central data base 50. The resulting system dependent data base changes are applied to the central data base 50 and to the processors 60 of the switching system.

The CAT code resident in CAT 40 is table driven software that uses software registers resident in system memory for intermediate calculation and manipulation of internal CAT code data. The main programs, as well as the subroutines of CAT 40, share these registers for data manipulation, data storage and data passing. The structure of the CAT code is such that the aforementioned registers are the local variables of the programming language with the designer or programmer determining the register usage.

Figure 2:
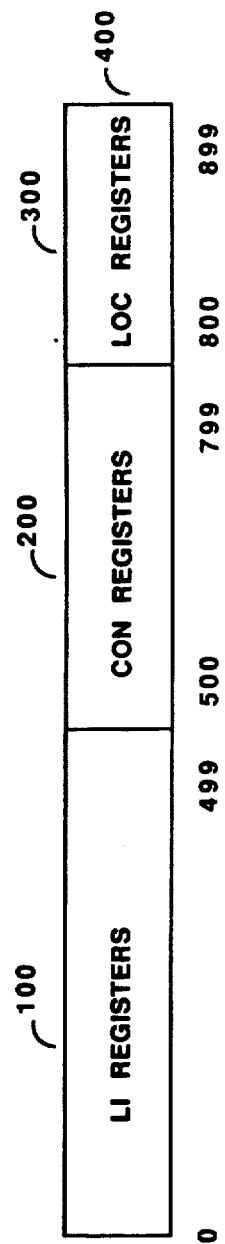
FIG. 2 is a diagram of software register allocation used by the command analysis table, in accordance with the present invention.

With reference to FIG. 2 of the present invention, a map of the CAT software register assignments is shown. Data associated with an input RC command is stored in the LI registers (I/O variables) 100. The LI registers 100 are also used when generating the output for RC commands. The interpreter of CAT 40 uses these registers to place in the appropriate registers a representation of the RC command to be processed. The CON registers 200 are used as global (general use) variables, that store intermediate values and calculations. The LOC registers 300 are used exclusively for subroutine parameter passing and local variables and are transparent to the user. The data in the LOC registers 300 can be defined as local routine variables. In this particular example 500 I/O variables, 300 general use variables and 100 local routine variables are mapped in the example in FIG. 2. The 900 register array shown, comprises the Local Command Buffer (LCB) 400 of CAT 40.

It will be helpful at this point to briefly summarize the manner in which the present invention operates.

The interpreter associated with CAT 40, uses special operating codes (op-codes) that allow the calling program to put pertinent information about the calling parameters into a temporary storage area. The called program or subroutine, uses a second op-code set to collect the stored parameters in the temporary storage area. The pulled parameters are then used to initialize the local variables of the called subroutine associated with LOC registers 300 of LCB 400 and to save pertinent information for returning back to the calling program.

Parameters are passed to the called subroutine in one of two ways, by value or by reference. When parameters are passed by value, then only the register data contents are sent to the called subroutine and none are returned (similar to read only variables). When a parameter is passed by reference, then the register data contents are sent and used by the called subroutine and modified data is returned back to the registers (similar to read/write variables). The LI 100 (input/output) 100 registers, as well as, the CON 200 (general use) registers of the LCB 400 can contain read only and read/write variables.

Figure 3:
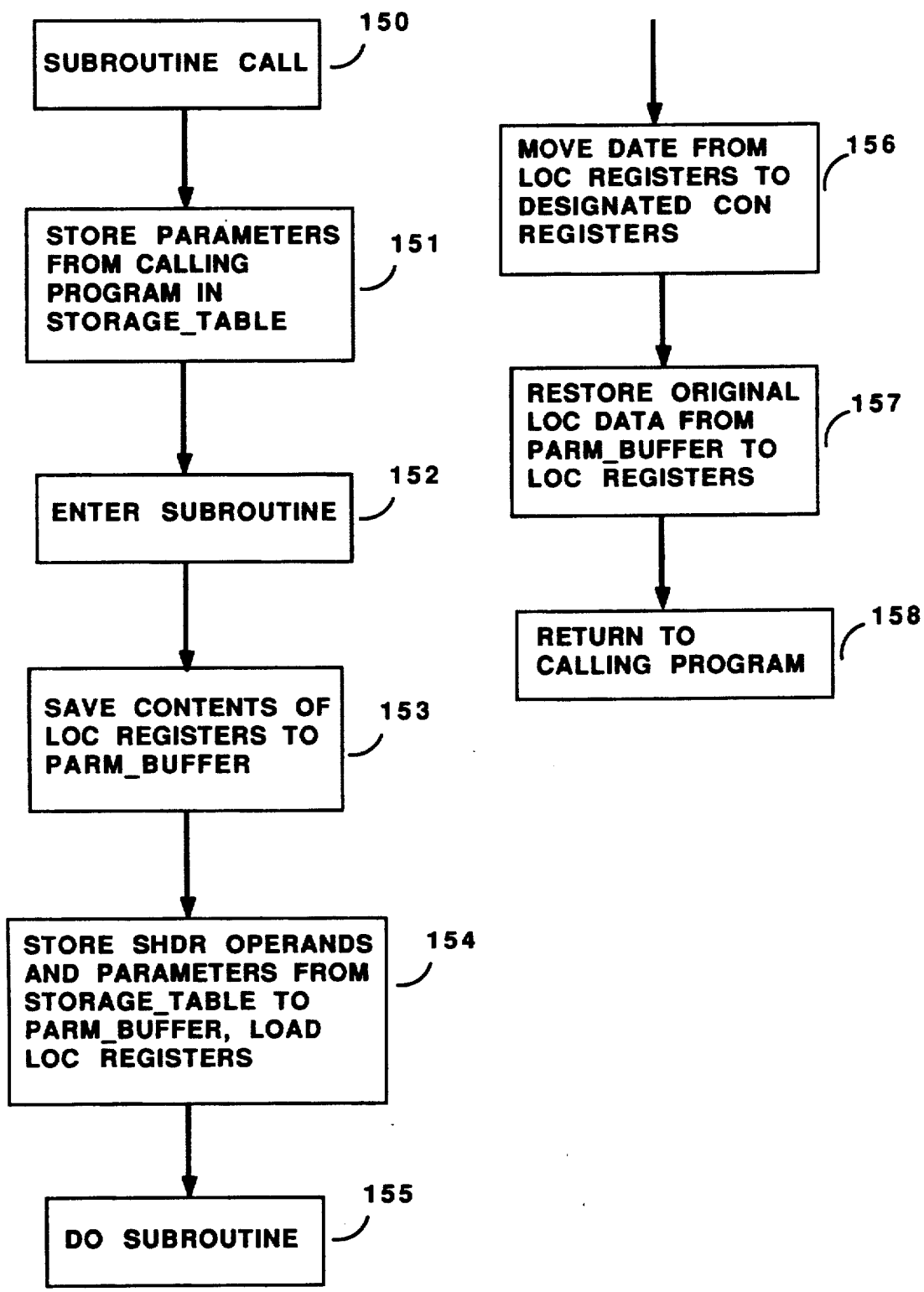
FIG. 3 is a flow chart showing the method for passing data parameters between a calling program and a called subroutine, in accordance with the present invention.

Turning now to FIG. 3 and with renewed reference to FIG. 2, the method for parameter passing used by the present invention will now be explained in detail.

The CAT code will pass parameter information stored in one of the LI 100 or CON 200 registers to a called subroutine by the usage of op-codes. When a subroutine call 150 is made from a calling program, a PARMR op-code will pass parameters from a range of consecutive registers. The PARMR op-code requires 2 operands, the starting register and the ending register. A PARML op-code will pass a list of individual parameters. The PARML op-code requires 2 or more operands. The first operand indicates the number of elements of the list with the following operands indicating the registers to be passed. Both of these op-codes cause data to be stored into a temporary storage area labeled STORAGE_ TABLE 151.

The STORAGE_ TABLE is an array of buffer locations with each location defined by a RC PARM_ REC data group.

The RC PARM_ REC data set includes the following three data elements.

VAL = the value in the register.
LI = the register where the value originated.
PRES = Indicates whether the register has been initialized.

RC PARM_REC

The following is an example of how CAT code assembly level statements are used to load the STORAGE_ TABLE. The CON op-code below is equivalent to the LOAD or MOVE instruction commonly found in assembly languages.
    PARML 1 13

In accordance with the definition of the PARML op-code, the first operand after op-code PARML defines the number of elements of the list, 1 in this example, and the second operand the register to be passed. In this example the data contained in the LI register 13 is to be transferred to RC STORAGE_ TABLE.

```
CON      CON0 5    {CON0 = CON register 500, CON1 = CON}
CON      CON1 6    {register 501, etc. These global}
CON      CON2 7    {registers have been assigned the}
                   {values 5, 6 and 7.}
PARMR    CON0
         CON2
```

From the previous discussion on the PARMR op-code, the CON0, CON2 operands indicate a range of the registers whose data is to be passed to the RC STORAGE_ TABLE.

When the two operations detailed above are completed, the RC STORAGE_ TABLE will contain the following information which will be available for use by the called subroutine.

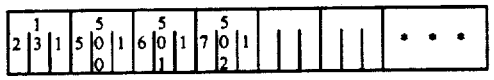

RC STORAGE_TABLE

As can be seen above, the data from the LI register 13, which has a value of 2, is loaded into the first location of RC STORAGE_ TABLE, in accordance with the format of the RC PARM_ REC data set. Similarly, the data transferred from CON registers 500 through 502 are loaded in the succeeding locations of the RC STORAGE_ TABLE.

Returning back to FIG. 3, after the parameter data has been stored to the RC STORAGE_ TABLE the called subroutine is entered 152. The subroutine uses the SHDR op-code as one of its first statements. The SHDR op-code has 3 required operands. The first is the number of expected read only parameters. The second is the number of read/write parameters and the third is the number of local variables (LOC registers) required for the read/write operation. Next the SHDR operands and the contents of the RC STORAGE_ TABLE are prepared to be copied to a second temporary storage area, the RC PARM_ BUFFER. However, before the parameters are copied, the CAT interpreter saves the data already in the LOC registers in PARM_ BUFFER as shown at 153 on FIG. 3. This operation is similar to "pushing" variables onto a stack. This prevents data from being destroyed that might have been placed into the LOC registers by the calling routine. The SHDR operands and the contents of RC STORAGE_ TABLE are then copied to RC PARM_ BUFFER. The CAT interpreter than uses the parameter information transferred to RC PARM_ BUFFER to copy the data from the LI AND CON registers to the first and succeeding LOC registers 154. The called subroutine now has a set of local variables that are private in use.

The following is an example of how CAT code assembly level statements are used to load the RC PARM_ BUFFER.

```
NAME    SUB1     {This is the entry point for
                 {subroutine SUB1}
        SHDR 1   {There is one read only parameter}
             3   {There are 3 read/write parameters}
             3   {There are 3 local variables}
```

After the SHDR op-code is invoked, the RC PARM_ BUFFER contains the following information.

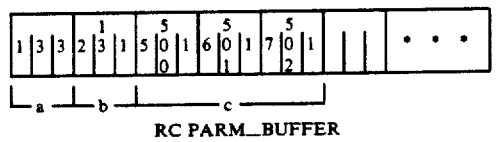

RC PARM_BUFFER

The first location (a) in the RC PARM_ BUFFER holds the operands of the SHDR op-code. In this example, 1 is the number of read only parameters, 3 is the number of read/write parameters, and 3 is the number of LOC registers required by the subroutine. The second location in the RC PARM_ BUFFER (b), stores the read only parameter and the next three locations (c) store the read/write variables.

When the RC PARM_ BUFFER is loaded the subroutine is executed 155.

When the called subroutine is finished, the CAT interpreter will use the information stored in RC PARM_ BUFFER to move the data from the LOC registers to CON registers designated by the PARML or PARMR op-codes 156.

In addition, the CAT interpreter "pops" the old LOC data and restores it back to the LOC registers, restoring the data that was contained in the LOC registers before the subroutine was entered and the SHDR op-code executed 157. The program then returns to the calling routine 158.

It will be appreciated by those skilled in the art, that the method of the present invention, just described, allows for parameter passing between a calling and a called routine that is largely transparent. This negates the need for tracking register usage in order to prevent corruption of the calling programs. The method of the present invention further provides for local variables for the exclusive use by each called routine and restores data that was contained in the local variables before the called routine was entered.

Furthermore, it will be obvious to those skilled in the art that numerous modifications to the present invention can be made without departing from the scope of the invention as defined by the appended claims. In this context, it should be recognized that the essence of the invention resides in a new and improved method for passing data parameters between a calling program and a called subroutine in a command analysis table of a computer stored data base system.

What is claimed is:

1. A method for passing data parameters and parameter values between a calling routine and a called subroutine in a stored program control computer system having a data base system, said stored program control computer system operating in accordance to data stored in said data base, and said data base arranged to be modified and updated by commands and data input to said data base system by a user terminal or a magnetic data device and directives defined by a command analysis table contained in said stored program control computer system, and said command analysis table including a local command buffer having a plurality of input/output registers and global registers for the storage of parameter values between the calling routine and a called subroutine, said method comprising the steps of:

(1) providing a plurality of local variable registers to said local command buffer;

(2) providing a user enterable initialization command code, invoked before said called subroutine is entered, said initialization command code including;

(a) register identification data defining the input/output registers and global registers of said local command buffer containing parameter values to be passed to said called subroutine;

(3) gathering the parameter values contained in the respective defined input/output and global registers of said local command buffer;

(4) storing said register identification data and associated parameter values to a first temporary storage means;

(5) providing a user enterable subroutine command code, invoked as the first statement of said called subroutine including;

(a) a first sum representing the input/output and global registers containing read only parameter values used by said called subroutine;

(b) a second sum representing the input/output and global registers containing read/write parameter values used by said called subroutine;

(c) a third sum of the required number of local variable registers needed to be used by said called subroutine;

(6) storing the current contents of the said local variable registers defined by the required number of local variable registers needed by said called subroutine in a second temporary storage means;

(7) storing said first, second, and third sums to said second temporary storage means;

(8) storing the contents of said first temporary storage means to said second temporary storage means;

(9) transferring the parameter values contained in the defined input/output registers and defined global registers to successive local variable registers;

(10) executing said subroutine using the parameter values contained in said local variable registers, and upon completion of said called subroutine;

(12) transferring the contents of said local variable registers used by said called subroutine to said global registers defined by said register identification data contained in said second temporary storage means;

(13) returning the original contents of said local variable registers from said second temporary storage means to said local variable registers; and

(14) returning to said calling program from said called subroutine.

2. The method of claim 1 wherein said first temporary storage means is a STORAGE_ TABLE buffer comprises an array of software storage locations and each buffer location includes said register identification data and said associated parameter data.

3. The method of claim 2 wherein each of said software storage location of said STORAGE_ TABLE further includes register initialization data.

4. The method of claim 1 wherein said second temporary storage means is a PARM_ BUFFER comprising an array of software storage locations said first location storing said first, second and third sums and said next successive locations storing said register identification data and said associated parameter data transferred from first storage means.

5. A method for passing data parameters and parameter values between a calling routine and a called subroutine in a stored program control computer system having a data base system, said stored program control computer system operating in accordance to data stored in said data base, and said data base arranged to be modified and updated by commands and data input to said data base system by a user terminal or a magnetic data device and directives defined by a command analysis table contained in said stored program control computer system, and said command analysis table including a plurality of input/output storage means and global storage means for the storage of parameter values between the calling routine and a called subroutine, said method comprising the steps of:

(1) providing a plurality of local variable storage means;

(2) invoking a first command, including data identifying the input/output storage means and global storage means containing parameter values to be passed to said called subroutine;

(3) gathering the parameter values contained in the respective identified input/output and global storage means;

(4) storing the register identification data and associated parameter values in first temporary storage means;

(5) invoking a second command, including a first sum representing the input/output storage and global storage means containing read only parameter values used by said called subroutine, a second sum representing the input/output and global storage means containing read/write parameter values used by said called subroutine, and a third sum of the required number of local variable storage means needed to be used by said called subroutine;

(6) storing the current contents of said local variable storage means identified by the required number of local variable storage means needed by said called subroutine in second temporary storage means;

(7) storing said first, second, and third sums to said second temporary storage means;

(8) storing the contents of said first temporary storage means to said second temporary storage means;

(9) storing the parameter values contained in the identified input/output storage means and identified global storage means to successive local variable registers;

(10) executing said called subroutine using the parameter values contained in said local variable storage means, and upon completion of said called subroutine;

(11) transferring the contents of said local variable storage means to said global storage means;

(12) returning the original contents of said local variable storage means from said second temporary storage means; and

(13) returning to said calling program from said called subroutine.

* * * * *